US008291397B2

(12) United States Patent
Ahuja et al.

(10) Patent No.: US 8,291,397 B2
(45) Date of Patent: Oct. 16, 2012

(54) COMPILER OPTIMIZED FUNCTION VARIANTS FOR USE WHEN RETURN CODES ARE IGNORED

(75) Inventors: Manish Ahuja, Pflugerville, TX (US); Nathan D. Fontenot, Georgetown, TX (US); Jacob L. Moilanen, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 12/060,894

(22) Filed: Apr. 2, 2008

(65) Prior Publication Data

US 2009/0254893 A1    Oct. 8, 2009

(51) Int. Cl.
*G06F 9/45* (2006.01)
(52) U.S. Cl. .................. 717/154; 717/151
(58) Field of Classification Search .......... 717/152, 717/162
See application file for complete search history.

(56) References Cited

U.S. PATENT DOCUMENTS

| 5,850,554 | A  | * | 12/1998 | Carver ............... 717/162 |
| 6,202,205 | B1 | * | 3/2001  | Saboff et al. ......... 717/151 |
| 6,463,582 | B1 | * | 10/2002 | Lethin et al. ......... 717/158 |
| 7,000,227 | B1 |   | 2/2006  | Henry |
| 2004/0006762 | A1 |   | 1/2004  | Stewart et al. |
| 2004/0244009 | A1 |   | 12/2004 | Bak et al. |
| 2005/0015750 | A1 |   | 1/2005  | Bley et al. |
| 2005/0050528 | A1 |   | 3/2005  | Wang |
| 2005/0144606 | A1 | * | 6/2005  | Li et al. ............... 717/162 |
| 2005/0149914 | A1 |   | 7/2005  | Krapf et al. |
| 2006/0085460 | A1 |   | 4/2006  | Peschel-Gallee et al. |
| 2007/0169039 | A1 |   | 7/2007  | Lin |

OTHER PUBLICATIONS

Davidson, "A Study of a C Function Inliner", Aug. 1998, Johyn Wiley & Sons, vol. 18(8), p. 775-790.*

* cited by examiner

*Primary Examiner* — Li B Zhen
*Assistant Examiner* — Duy Khuong Nguyen
(74) *Attorney, Agent, or Firm* — Stephen J. Walder, Jr.; Steven L. Bennett

(57) ABSTRACT

A mechanism and functionality are provided for generating and using compiler optimized function variants. These variants may be used, for example, in situations where return values of functions called by code are not thereafter used by the code calling the functions. In particular, for a function called by computer code, at least two variants for the function may be generated. A function call, for calling the function, within original computer code may be analyzed to determine which variant of the at least two variants to use for the function call. The function call may be modified in the original computer code, to generate modified computer code, based on results of the analysis identifying which variant of the at least two variants to use for the function call.

19 Claims, 5 Drawing Sheets

```
300 ⎧ 310 ⎧ int* foo(void){
   ⎪    ⎨     int* ret;
   ⎪    ⎪
   ⎪    ⎩     <do stuff>
   ⎪
   ⎪    ⎧ ret = malloc(256);
   ⎪    ⎪ if(ret == NULL){
   ⎪    ⎪     return NULL;
   ⎨ 320⎨ }
   ⎪    ⎪
   ⎪    ⎪ for(i = 0; i < 256; i++){
   ⎪    ⎪     ret[i] = i^2;
   ⎪    ⎩ }
   ⎪
   ⎪ 330 ~ <do more stuff>
   ⎪
   ⎪    ⎧ return ret;
   ⎪ 340⎨
   ⎩    ⎩ }
```

*FIG. 3*

```
⎧ void foo_noreturn(void){
⎨  310 ~<do stuff>
⎪       <do more stuff> ~330
⎩ }
```

*FIG. 4*

COMPILER OPTIMIZED FUNCTION VARIANTS FOR USE WHEN RETURN CODES ARE IGNORED

BACKGROUND OF THE INVENTION

1. Field of the Invention

The present application relates generally to an improved data processing apparatus and method and more specifically to an apparatus and method for providing and using optimized function variants in compiled code when return codes of function or method calls are ignored upon return.

2. Background of the Invention

A compiler is a computer program, or set of programs, that translates source code, in a high-level programming language, into code of a lower level language, e.g., assembly language or machine language. Commonly, the output of the compiler has a form suitable for processing by another program, such as a linker, but it may also be output in a human-readable format. The most common use of a compiler is to translate source code such that an executable program is generated. Compilers are likely to perform many, or all, of the following operations: lexical analysis, pre-processing, parsing, semantic analysis, code generation, and code optimization.

One type of code optimization that may be performed by a compiler is to perform inline expansion, i.e. inlining, of function calls or method calls to achieve a performance improvement over non-inline function, or method, calls. That is, functions within source code may be specified as inline function calls thereby requesting that the compiler inline the function, i.e. copy the complete contents of the function, into the resulting translated code. Inline expansion is typically used to eliminate the inherent time overhead that occurs in calling a function. Inline expansion is typically used for functions that execute frequently, as this overhead is more significant in this case. Inlining also has a space benefit for very small functions and is an enabling transformation for other optimizations.

While inlining may provide a performance benefit, there are some inefficiencies associated with inlining. One major inefficiency is the problem with code bloat. That is, each time an inlined function or method call appears in the source code, it is replaced with the full content of the function or method being called. This may significantly increase the size of the resulting executable code, e.g., if a function is called 200 times, there will be 200 copies of that function. This code bloat may lead to slower performance and "thrashing." For example, if the executable size of the program is too big, the system may spend most of its time going out to disk to fetch the next chunk of code thereby causing the system to "thrash" on memory pages.

In addition, often times in code functions are called without checking the return code or value. For example, a memory allocation function may be called in order to allocated a register but the calling code may not do anything with the value returned by the memory allocation function. When this happens, all the code that went into generating the return value may result in wasted processor cycles and memory. This is made even more of an issue if this function code is inlined and thus, copied many times into the resulting executable code.

BRIEF SUMMARY OF THE INVENTION

In one illustrative embodiment, a method, in a data processing system, is provided for compiling computer code. The method may comprise, for a function called by computer code, generating at least two variants for the function. The method may further comprise analyzing a function call, for calling the function, within original computer code to determine which variant of the at least two variants to use for the function call. Moreover, the method may comprise modifying the function call in the original computer code, to generate modified computer code, based on results of the analysis identifying which variant of the at least two variants to use for the function call.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary diagram of a first variant of a function in accordance with one illustrative embodiment in which the code of the function is not changed;

FIG. 4 is an exemplary diagram of a second variant of a function in accordance with one illustrative embodiment in which code related to the return value of the function is removed;

DETAILED DESCRIPTION OF THE INVENTION

The illustrative embodiments provide a mechanism for optimizing function calls in code for calls in which the calling code does not utilize the returned value from the function. The mechanisms of the illustrative embodiments may be implemented in, or in association with, a compiler of computer code. Thus, the mechanisms of the illustrative embodiments may be utilized in many different types of data processing environments including a distributed data processing environment, a single data processing device, or the like. For example, in a distributed data processing system, source code may be supplied by a client computing device to a server, or resident on a server and edited by a client computing device via a communication connection, such that the server may execute a complier on the source code to generate optimized and executable code. Alternatively, the compiler, source code, etc., may all be resident on the same computing device.

Figure 1:
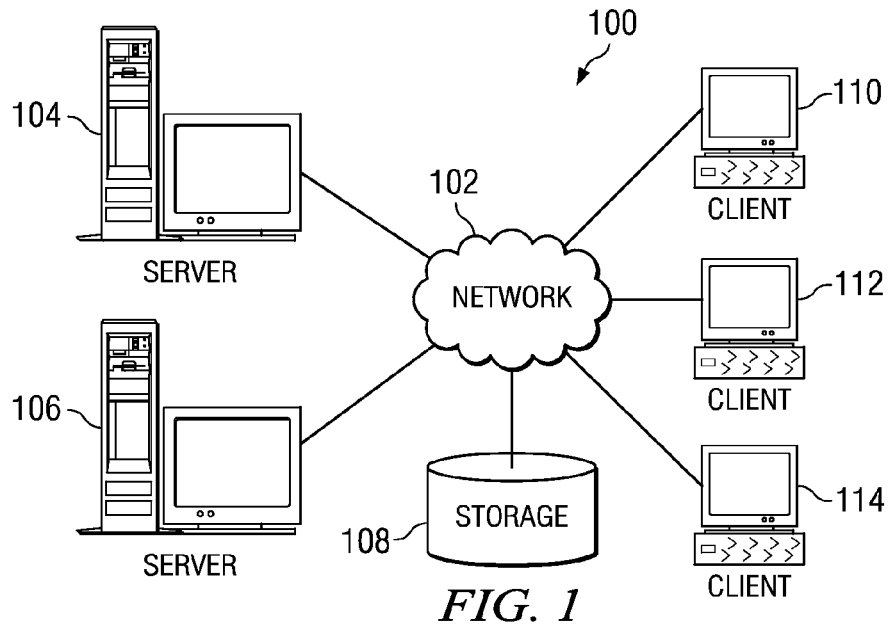
FIG. 1 is an exemplary block diagram of a distributed data processing system in which aspects of the illustrative embodiments may be implemented.
Figure 2:
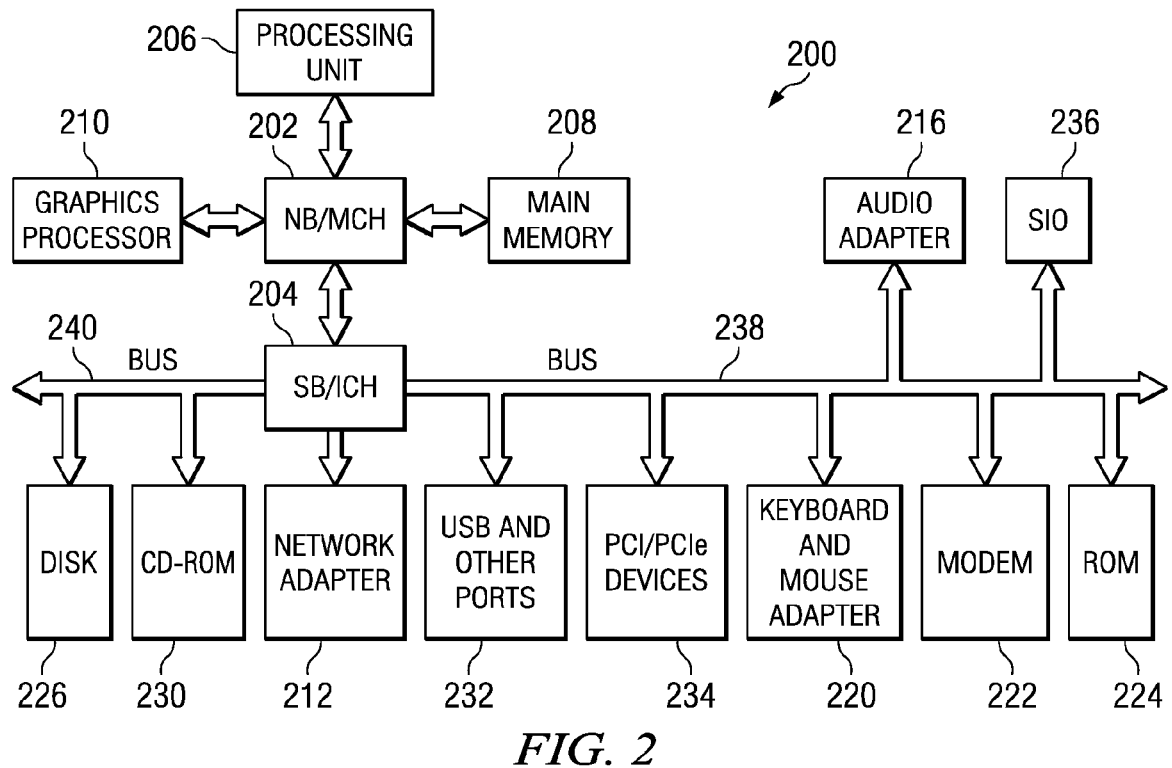
FIG. 2 is an exemplary block diagram of a computing device in which exemplary aspects of the illustrative embodiments may be implemented.

In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation, this is only exemplary and is not intended to state or imply any limitation with regard to the features of the present invention. To the contrary, the illustrative embodiments are intended to include distributed data processing environments and any other embodiments in which a compiler is used to optimize and translate source code into a lower level language code representation, e.g., machine/object code, executable code, or the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, in one illustrative embodiment, a distributed data processing system implementation may be used in which source code may be supplied by a client computing device, e.g., client 110, to a server, e.g., server 104, or resident on a server 110 and edited by a client computing device 110 via a communication connection, e.g., network 102, such that the server 104 may execute a compiler on the source code to generate optimized and executable code. Alternatively, the compiler, source code, etc., may all be resident on the same computing device, such as a stand-alone version of the data processing system 200 in FIG. 2. Whether one of these implementations is utilized, or another implementation, the mechanisms of the illustrative embodiments enhance the compiler or an associated linker so that the compiler/linker identifies function calls within the source code, generates at least two variants of the function being called, and identifies, based on characteristics of the calls to that function in the source code, which variant of the function to use to modify or replace the original function call or to use to perform in-line expansion of the function in the source code.

In one illustrative embodiment, the mechanisms of the illustrative embodiments are implemented in a combination of a compiler and a linker. The compiler may be a backend compiler of a compiling system comprising a frontend and backend compiler before the linker, for example. The linker, or link editor, is a program that takes one or more objects generated by the compiler and assembles them into a single executable program. As part of this assembly, the compiler of the illustrative embodiments may analyze the source code to identify the various function calls mentioned above and generate variants for these functions. Either the compiler, the linker, or a combination of the compiler and the linker, may modify or replace the actual calls to the functions such that an appropriate variant is called so as to achieve optimization of the source code. For purposes of the following discussion, it will be assumed that the mechanisms of the illustrative embodiments are implemented in the compiler when generating machine code from an intermediate representation of source code input to the compiler with the linker performing operations on the resulting optimized machine code to generate an executable program. However, it should be appreciated that functions of the illustrative embodiments attributed to the compiler may equally be performed by the linker without departing from the spirit and scope of the present invention.

When source code is received by a compiler, the source code is analyzed and transformed by the compiler into a lower level language code, such as machine code, machine/object code, or the like. As part of this compilation of the source code, the code may be optimized using various optimization techniques. The resulting machine/object code is provided to a linker which links the objects to generate executable code. In the process of generating the machine code the compiler may analyze the source code, an intermediate representation of the source code, or the machine code generated by the compiler, for example, to identify function or method calls. For each function or method call, the compiler may generate at least two variants for the at least one function or method. One of the variants is actually the original function or method without modification, i.e. the original function or method. A second variant is a copy of the original function or method with code of the function or method that is directed to generating return value(s) being omitted from the second variant. The first variant is used in cases where the code calling the function or method actually uses the returned value(s) in some way. The second variant is used in cases where the code calling the function or method does not use the returned value(s).

In some cases, not all of the code in the original function or method that is directed to generating a return value may be eliminated in the second variant. For example, code that affects a global register value, or otherwise may affect the operation of other code if the return value is not generated may be kept in the second variant while code generating other return value(s) that do not affect the operation of other code may be omitted from the second variant. Only code whose omission will not adversely affect other code may be removed when generating modified variants of the original function or method's code.

Having generated variants for the functions or methods called in the original machine/object code, these variants may be maintained in a data structure associated with the compiler. The compiler may analyze function or method calls within the machine/object code to determine which variant of the at least two variants to use for each function or method call in the machine/object code. For example, the compiler may analyze the function or method call to determine if the value(s) returned by the called function or method are used in any way. For example, if the calling code sets a parameter or variable to a value generated based on the returned value(s) of a called function or method, then it is determined that a first variant in which code for generating a return value is present is used with this function or method call. If the calling code does not set a parameter or variable to a value generated based on the returned value(s) of the called function or method, then executing the code for generating the return value(s) constitutes wasted processor cycles since the returned value(s) are not used. Thus, in such cases, the second variant is used in which such code for generating the return value(s) is omitted and thus, processor cycles are not wasted on executing such code.

The linker may modify at least one function or method call of the one or more function or method calls in the original machine/object code based on results of the analysis identifying which variant of the at least two variants to use for the at least one function call. For example, the linker may change the code invoking the function or method so that one of the variants is invoked in its stead. For example, if an original function called by the machine/object code is "foo( )," the first variant may also be "foo( )" since not modification to the code is made, and the second variant may be "foo_noreturn( )" in which code for generating a return value is omitted. Thus, if the calling code does not use the value returned by "foo( )", then the calling code may be modified to call the second variant "foo_noreturn( )" thereby saving the processor cycles that would otherwise be used to generate the return value.

The above illustrative embodiment assumes that the function or method that is called is not in-line expanded in the machine/object code by the linker. However, in other illustrative embodiments, the linker may instead of modifying the function or method that is called by the machine/object code, in-line the appropriate variant into the machine/object code. Such in-lining eliminates the performance issues associated with the overhead of calling non-inlined functions or methods, but as mentioned above, may result in code bloat. The mechanisms of the illustrative embodiments may minimize this code bloat by in-lining the second variant of the function or method in which code generating the return value(s) is omitted where possible. Moreover, whether the variants of the function or method are in-lined or non-inlined, processor cycles are saved by not executing superfluous code associated with generating return value(s) that are not used by the calling code.

Moreover, as discussed above, rather than the modifications being implemented in the linker on machine/object code output by the compiler, the mechanisms of the illustrative embodiment may operate on the source code itself and modify the function/method calls in the source code using the compiler itself. For example, the mechanisms of the illustrative embodiments may be implemented in a backend compiler that operates on either source code or generated machine/object code, such as during optimization of the code before output to a linker. In either implementation, superfluous code for generating return value(s) that are not used is removed so that processor cycles are not wasted on generating such return values and code bloat is minimized.

FIG. 3 is an exemplary diagram of a first variant of a function in accordance with one illustrative embodiment in which the code of the function is not changed. The first variant is a copy of the original function, which in this case is referred to as "foo( )." As can be seen in FIG. 3, this first variant, as well as the original function, contains a first portion of code 310 in which various operations are performed to thereby perform useful work, referred to herein simply as "<do stuff>" for simplicity. In addition, this first variant has an additional portion of code 320 in which a return value of the function "foo( )" is calculated. Moreover, a third portion of code 330 is provided in the function "foo( )" for performing other useful work, referred to herein simply as "<do more stuff>" for simplicity. Finally, the function "foo( )" has a statement 340 for returning the calculated return value.

FIG. 4 is an exemplary diagram of a second variant of a function in accordance with one illustrative embodiment in which code related to the return value of the function is removed. With this second variant, as compared to the first variant in FIG. 3, the portion of code 320 for generating a return value is eliminated along with the statement 340 for returning the calculated return value. As shown in FIG. 4, the second variant of the function only contains the portions 310 and 330 which perform useful work and are not directed to generating the return value(s) of the function. Thus, when this second variant is executed, as opposed to the first variant or the original function code, code associated with generating a return value is not executed since it does not exist in the second variant and only the code necessary for performing useful work is actually executed.

These function variants may be generated by a compiler or linker in response to the compiler or linker encountering a function call to this function in either source code or machine/object code when performing compilation, optimization, and/or linking operations. The function variants may then be invoked by modified code, modified to invoke the variants based on whether the invoking code uses the return value(s) or not. For example, a function call may originally be of the form:

```
int main(void){
    foo( );
}
```

The modified function call may thus, be of the form:

```
int main(void){
    foo_noreturn( );
}
``` where "foo_noreturn( )" is a variant of the original "foo( )" function that has had the code associated with generating and returning return value(s) removed from the function. Alternatively, the function variants may be in-line expanded within the source or machine/object code, as described previously. Thus, these function variants maybe generated and utilized by a compiling system in accordance with the illustrative embodiments.

Figure 5:
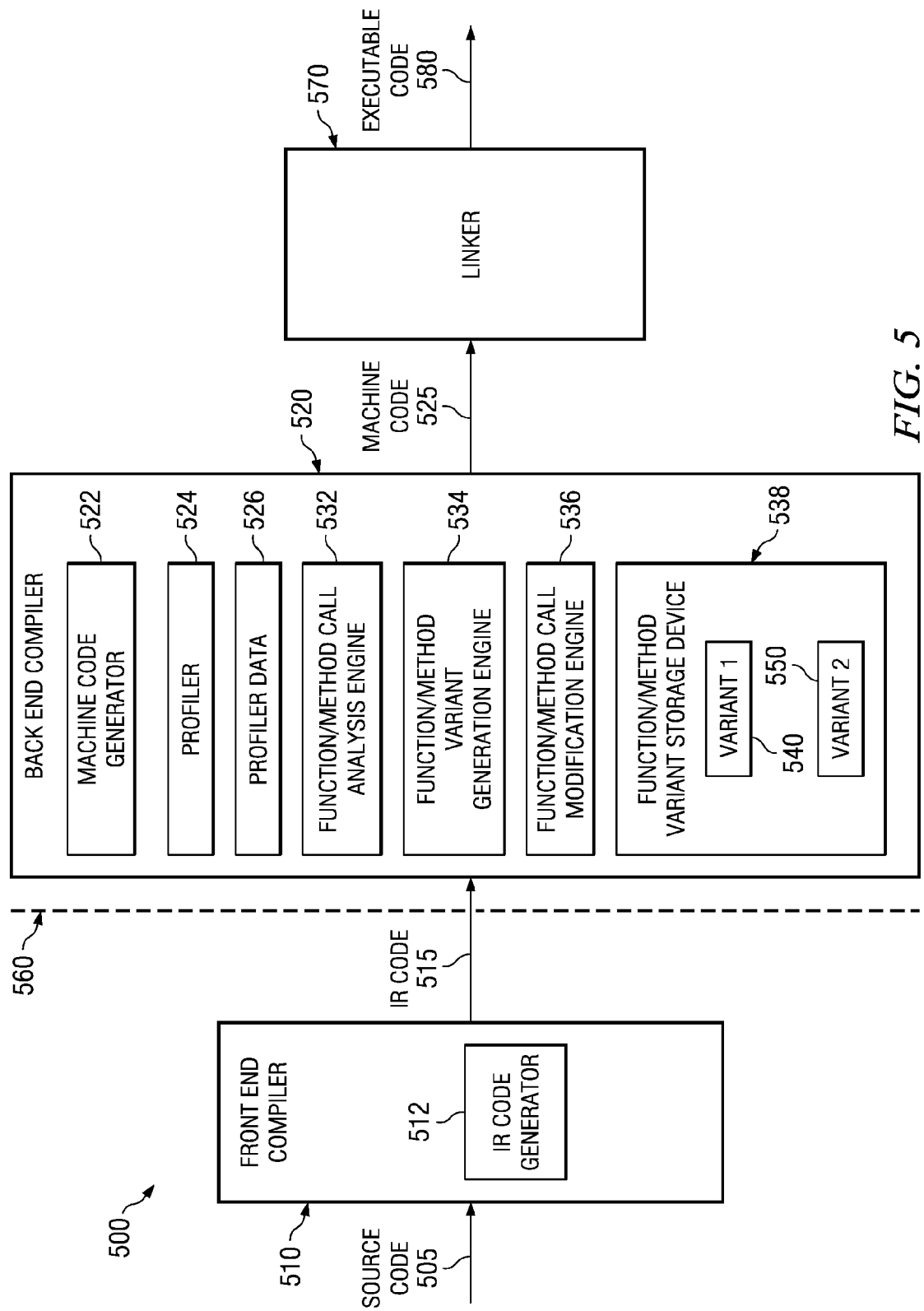
FIG. 5 is an exemplary block diagram of a compiling system in accordance with one illustrative embodiment.

FIG. 5 is an exemplary block diagram of a compiling system in accordance with one illustrative embodiment. As shown in FIG. 5, the compiling system 500 includes a front-end compiler 510 and a back-end compiler 520. For most known compilers, there is an architected division (indicated by dotted line 560) between the front-end compiler 510 and the back-end compiler 520. Front-end compilers 510 are used to convert source code 505 to an intermediate representation 515. Back-end compilers 520 are used to convert the intermediate representation 515 to machine code 525 for a particular hardware configuration (i.e., platform). This designed division between front-end compilers and back-end compilers is efficient, because it allows front-end compilers for a number of different languages (e.g., C++, Java, Ada, etc.) to be used with a single back-end compiler for a given platform (e.g., IBM iSeries). Likewise, a single front-end compiler for the Java programming language can be used with multiple back-end compilers if the code needs to be compiled to run on different platforms.

Front-end compiler 510 includes an intermediate representation (IR) code generator 512 that processes the source code 505 and generates instructions in intermediate representation (IR) code 515. Back-end compiler 520 includes a machine code generator 522 that processes the intermediate representation 515 and generates machine code 525 that is executable on a particular platform. Back-end compiler 520 also includes a profiler 524 that is used to obtain profile data 526 when the machine code 525 is run with a set of sample inputs. As used herein, the term "sample inputs" means inputs that simulate real-world execution of the machine code in its intended environment. Machine code generator 522 includes the capability of using profile data 526 to optimize the machine code 525 by processing the intermediate representation code 515 a second time according to the profile data 526.

The machine code 525 generated by the machine code generator 522 may be optimized using the mechanisms of the illustrative embodiments, as may be implemented by the back-end compiler 520. That is, the back-end compiler 520 may further comprise a function/method call analysis engine 532, a function/method variant generation engine 534, a function/method call modification engine 536 for modifying function/method calls in original machine code, and a function/method variant storage device 538. The function/method call analysis engine 532 may analyze function/method calls in the IR code 515 and determine whether the code calling the function/method utilizes any returned values of the called functions/methods. In addition, the function/method call analysis engine 532 may invoke the function/method variant generation engine 534 for generating one or more variants for the called function/method. The one or more variants comprise a variant 540 in which code associated with generating one or more return value(s) is omitted. Another variant 550 may be a copy of the original function/method that is unchanged. These variants 540 and 550 may be stored in the function/method variant storage device 538 for use by the back-end compiler 520 in optimizing the IR code 515 when generating machine code 525.

The function/method call modification engine 536 may modify function/method calls to make them either call one of the variants 540 or 550, in-line one of the variants 540 or 550, or the like, based on results of the analysis by the function/method call analysis engine 532 as to whether return values of the called function/method are utilized by the calling IR code 515. The result is modified machine code 525 which is then linked by the linker 530, possibly after other optimizations are performed, to thereby generate executable code 580. The executable code 580 is then output from the linker 570 for use by a processor. The processor may thus, execute the executable code 580. However, when executing this executable code 580, processor cycles for executing code to generate return values that are not used by the calling code in the executable code 580 are saved by not executing such return value calculating code.

It should be noted that while FIG. 5 shows one exemplary embodiment in which the elements 532-550 are implemented in the back-end compiler 520 and operate on the IR code 515, the present invention is not limited to such an embodiment. As previously mentioned above, the mechanisms of the illustrative embodiments, and thus the elements 532-550, may also be implemented in a linker, such as linker 570, or in a combination of the back-end compiler 520 and the linker 570. That is, all or some of the elements 532-550 in FIG. 5 may be provided in the linker 570 and may be configured to operate on the machine code 525 output by the back-end compiler 520.

Figure 6:
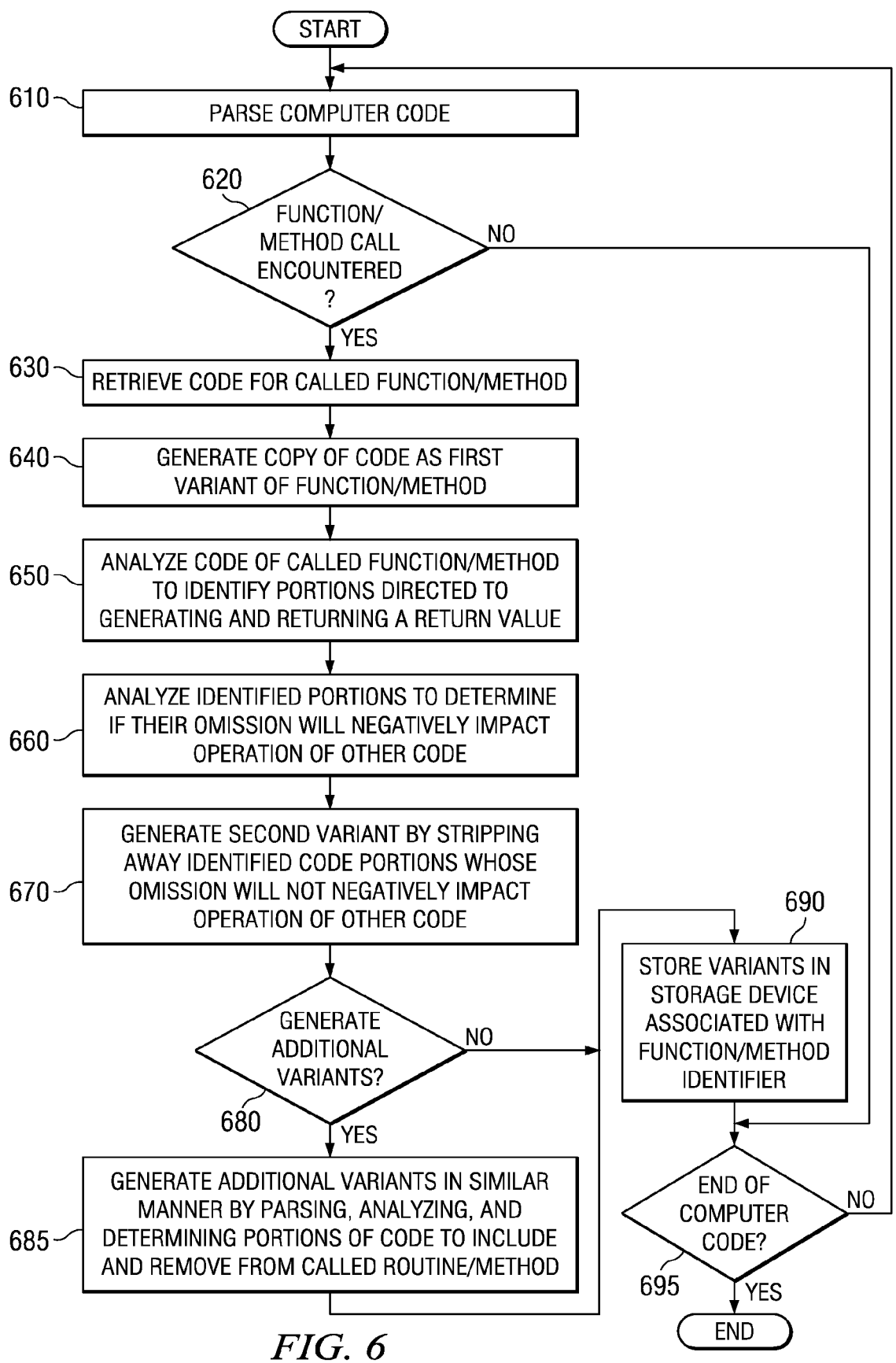
FIG. 6 is a flowchart outlining an exemplary operation for generating variants of a called function/method in accordance with one illustrative embodiment.

FIG. 6 is a flowchart outlining an exemplary operation for generating variants of functions/methods called by computer code. The operation outlined in FIG. 6 may be performed by an analysis engine in a compiler, linker, or the like. The analysis engine may comprise various components, such as elements 532-538 in FIG. 5, for example, that each perform their respective operations to achieve the result of generating one or more variants of a function/method called by computer code for later use in optimizing the computer code so as to eliminate wasted processor cycles on code for generating return values that are not utilized by the calling code.

As shown in FIG. 6, the operation starts with an analysis engine parsing the computer code (step 610) and determining if a function/method call is encountered (step 620). If a function/method call is encountered, then the code for the called function/method is retrieved by the analysis engine (step 630) and a copy of the code for the called function/method is generated by the analysis engine as a first variant of the function/method (step 640). The code for the called function/method is analyzed by the analysis engine to identify portions of the code that are directed to generating return values and returning those values (step 650). The identified portions of code are further analyzed to determine if their omission from the function/method would negatively impact other code that may rely on changes or values made by these portions of code (step 660).

The identified portions of the code that are directed to generating return values and returning those values, and which will not negatively impact other code, are omitted or stripped from a second copy of the code for the called function/method to thereby generate a second variant of the called function/method (step 670). A determination is made by the analysis engine as to whether additional variants are to be generated for this function/method (step 680). If so, the additional variants are generated in a similar manner as the previous variants with parsing and analysis of the code of the function/method to determine what code to include and what code to remove from the function/method and then generating a modified copy of the code of the function/method as a variant (step 685). Thereafter, or if additional variants are not to be generated, the variants are stored, in association with an identifier of the called function/method (such as a name of the called function/method, for example), in a storage device associated with the analysis engine for later use in modifying the function/method calls of the computer code (step 690).

Thereafter, or if a function/method call has not been encountered (step 620), a determination is made as to whether an end of the computer code has been encountered or not (step 695). If an end of the computer code has been encountered, the operation terminates. If an end of the computer code has not been encountered, then the operation returns to step 610.

Figure 7:
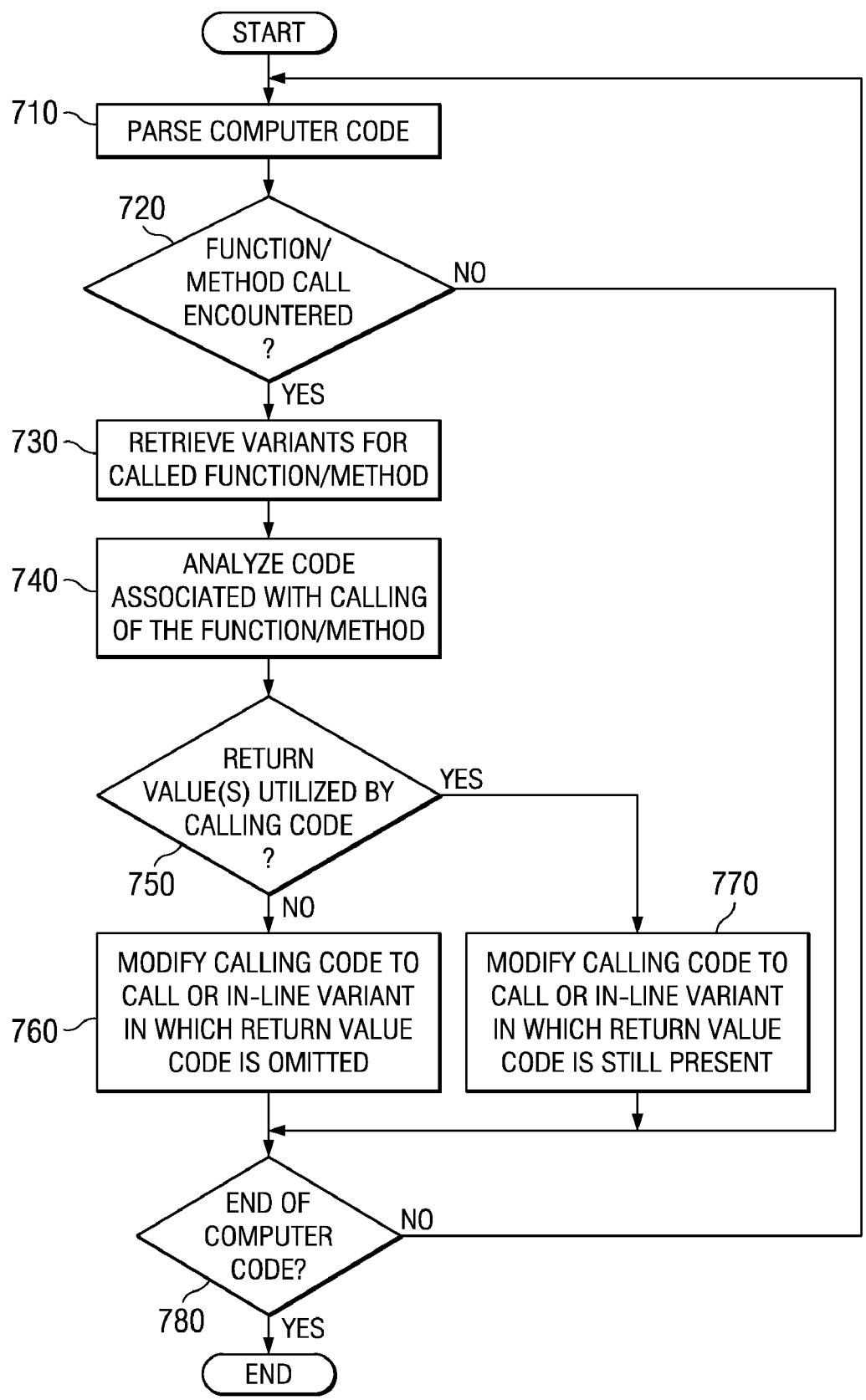
FIG. 7 is a flowchart outlining an exemplary operation for optimizing computer code by calling or in-lining variants of called functions/methods, in accordance with one illustrative embodiment.

FIG. 7 is a flowchart outlining an exemplary operation for optimizing computer code by calling or in-lining variants of called functions/methods, in accordance with one illustrative embodiment. The operation outlined in FIG. 7 may be performed by an analysis engine in a compiler, linker, or the like. The analysis engine may comprise various components, such as elements 532-538 in FIG. 5, for example, that each perform their respective operations to achieve the result of using variants of called functions/methods to optimize computer code so as to eliminate wasted processor cycles on code for generating return values that are not utilized by the calling computer code. The operation shown in FIG. 7 may be performed sequentially with the operation in FIG. 6 or substantially in parallel with the operation shown in FIG. 6.

As shown in FIG. 7, the operation starts with an analysis engine parsing the computer code (step 710) and determining if a function/method call is encountered (step 720). If a function/method call is encountered, the variants associated with the called function/method are retrieved (step 730). The analysis engine analyzes the code associated with the calling of the function/method (step 740) to determine if values returned by the called function/method are used by the calling computer code (step 750). If return values are not utilized by the calling computer code, then the calling code is modified to call or in-line a variant of the function/method in which code for generating return values has been removed (step 760). If return values are utilized by the calling computer code, then the calling code is modified to call or in-line a variant of the function/method in which code for generating return values is still present (step 770).

Thereafter, or if a function/method call has not been encountered (step 720), a determination is made as to whether an end of the computer code has been encountered or not (step 780). If an end of the computer code has been encountered, the operation terminates. If an end of the computer code has not been encountered, then the operation returns to step 710. The resulting modified computer code may be further processed, such as by further compilation, linking, etc., to generate executable code. This executable code may then be output for use by a processor. The processor may execute the executable code which has been optimized so as to minimize processor cycles associated with generating return values that are not used by the calling computer code.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for compiling computer code, comprising:
   for a function called by computer code, generating at least two variants for the function;
   storing the at least two variants for the function in a variant storage device, wherein a first variant for the function of the at least two variants comprises first code of the function that is unchanged from an original version of the code for the function, and wherein a second variant for the function of the at least two variants comprises second code of the function in which return value code directed to generating a return value is removed from the code of the function;
   performing return-value analysis on a function call, for calling the function, within original computer code to select a variant for the function of the at least two variants to use for the function call;
   retrieving, from the variant storage device, the selected variant for the function of the at least two variants; and
   modifying the function call in the original computer code, to generate modified computer code, based on results of the return-value analysis identifying which variant for the function of the at least two variants for the function to use for the function call,
   wherein:
   performing return-value analysis on the function call within the original computer code comprises:
      analyzing the function call to determine if the return value of the function is used by the original computer code; and
      selecting a corresponding variant for the function, of the at least two variants, to replace the function call based on results of the return-value analysis, and
   modifying the function call comprises inline expanding the function call by incorporating code of the selected variant for the function of the at least two variants into the modified computer code.

2. The method of claim 1, wherein only return value code whose omission will not adversely affect other code in the original computer code is removed from the second code of the second variant.

3. The method of claim 1, wherein the computer code is an intermediate representation code generated by a compiler based on source code input to the compiler, and wherein the method is implemented by the compiler executing on the data processing system.

4. The method of claim 1, wherein the computer code is machine code output by a compiler, and wherein the method is implemented by a linker executing on the data processing system.

5. The method of claim 1, further comprising:
   outputting executable code corresponding to the modified computer code for execution by at least one processor.

6. The method of claim 2, wherein return value code that affects a global register value is not removed from the second code of the second variant.

7. The method of claim 2, wherein return value code that affects an operation of other code if the return value is not generated is not removed from the second code of the second variant.

8. A computer program product comprising a computer recordable storage device having a computer readable program stored thereon, wherein the computer readable program, when executed on a computing device, causes the computing device to:
   generate, for a function called by computer code, at least two variants for the function;
   store the at least two variants for the function in a variant storage device, wherein a first variant for the function of the at least two variants comprises first code of the function that is unchanged from an original version of the code for the function, and wherein a second variant for the function of the at least two variants comprises second code of the function in which return value code directed to generating a return value is removed from the code of the function;
   perform return-value analysis on a function call, for calling the function, within original computer code to select a variant for the function of the at least two variants to use for the function call;
   retrieving, from the variant storage device, the selected variant for the function of the at least two variants; and
   modify the function call in the original computer code, to generate modified computer code, based on results of the return-value analysis identifying which variant for the function of the at least two variants for the function to use for the function call,
   wherein:
   performing return-value analysis on the function call within the original computer code comprises:

analyzing the function call to determine if the return value of the function is used by the original computer code; and selecting a corresponding variant for the function, of the at least two variants, to replace the function call based on results of the return-value analysis, and modifying the function call comprises inline expanding the function call by incorporating code of the selected variant for the function of the at least two variants into the modified computer code.

9. The computer program product of claim 8, wherein only return value code whose omission will not adversely affect other code in the original computer code is removed from the second code of the second variant.

10. The computer program product of claim 8, wherein the computer code is an intermediate representation code generated by a compiler based on source code input to the compiler, and wherein the method is implemented by the compiler executing on the data processing system.

11. The computer program product of claim 8, wherein the computer code is machine code output by a compiler, and wherein the method is implemented by a linker executing on the data processing system.

12. The computer program product of claim 9, wherein return value code that affects a global register value is not removed from the second code of the second variant.

13. The computer program product of claim 9, wherein return value code that affects an operation of other code if the return value is not generated is not removed from the second code of the second variant.

14. An apparatus, comprising:

a processor; and a memory coupled to the processor, wherein the memory comprises instructions which, when executed by the processor, cause the processor to:

generate, for a function called by computer code, at least two variants for the function;

store the at least two variants for the function in a variant storage device, wherein a first variant for the function of the at least two variants comprises first code of the function that is unchanged from an original version of the code for the function, and wherein a second variant for the function of the at least two variants comprises second code of the function in which return value code directed to generating a return value is removed from the code of the function;

perform return-value analysis on, a function call, for calling the function, within original computer code to select a variant for the function of the at least two variants to use for the function call;

retrieving, from the variant storage device, the selected variant for the function of the at least two variants; and modify the function call in the original computer code, to generate modified computer code, based on results of the return-value analysis identifying which variant for the function of the at least two variants to use for the function call, wherein:

performing return-value analysis on the function call within the original computer code comprises:

analyzing the function call to determine if the return value of the function is used by the original computer code; and selecting a corresponding variant for the function, of the at least two variants, to replace the function call based on results of the return-value analysis, and modifying the function call comprises inline expanding the function call by incorporating code of the selected variant for the function of the at least two variants into the modified computer code.

15. The apparatus of claim 14, wherein only return value code whose omission will not adversely affect other code in the original computer code is removed from the second code of the second variant.

16. The apparatus of claim 14, wherein the computer code is an intermediate representation code generated by a compiler based on source code input to the compiler, and wherein the method is implemented by the compiler executing on the data processing system.

17. The apparatus of claim 14, wherein the computer code is machine code output by a compiler, and wherein the method is implemented by a linker executing on the data processing system.

18. The apparatus of claim 15, wherein return value code that affects a global register value is not removed from the second code of the second variant.

19. The apparatus of claim 15, wherein return value code that affects an operation of other code if the return value is not generated is not removed from the second code of the second variant.

* * * * *